United States Patent
Hansen et al.

(10) Patent No.: US 6,366,921 B1
(45) Date of Patent: Apr. 2, 2002

(54) SYSTEM AND METHOD FOR DATA MANIPULATION IN A DYNAMIC OBJECT-BASED FORMAT

(75) Inventors: Robert C. Hansen, Johnson City; Scott A. Sylvester, Endicott, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,102

(22) Filed: Feb. 9, 1999

(51) Int. Cl.⁷ .............................................. G06F 17/30
(52) U.S. Cl. ......................... 707/103; 707/4; 707/102; 709/302; 709/303
(58) Field of Search ............................. 707/102, 103, 707/4; 709/302, 303

(56) References Cited

U.S. PATENT DOCUMENTS

| | | | |
|---|---|---|---|
| 4,652,879 A | | 3/1987 | Rudish et al. ............... 707/101 |
| 5,313,636 A | | 5/1994 | Noble et al. .................... 707/1 |
| 5,333,118 A | | 7/1994 | Rossmere et al. ...... 364/725.01 |
| 5,446,902 A | | 8/1995 | Islam et al. .................. 395/703 |
| 5,455,945 A | | 10/1995 | VanderDrift .................... 707/2 |
| 5,553,224 A | | 9/1996 | Saund et al. ................. 345/433 |
| 5,566,333 A | | 10/1996 | Olson et al. ................. 707/102 |
| 5,613,099 A | | 3/1997 | Erickson et al. ............. 395/500 |
| 5,787,425 A | * | 7/1998 | Bigus ............................ 707/6 |
| 5,977,967 A | * | 11/1999 | Berner et al. ................ 345/335 |
| 6,018,743 A | * | 1/2000 | Xu .............................. 707/103 |
| 6,052,670 A | * | 4/2000 | Johnson ........................ 705/27 |
| 6,154,786 A | * | 11/2000 | Williamson et al. ......... 709/315 |
| 6,173,439 B1 | * | 1/2001 | Carlson et al. ................. 717/1 |
| 6,199,195 B1 | * | 3/2001 | Goodwin et al. ............... 717/1 |
| 6,227,979 B1 | * | 5/2001 | Yamamoto et al. ......... 464/145 |

OTHER PUBLICATIONS

"Dynamically Inheritable Features in a Static OOPS Enviroment", *IBM Technical Disclosure Bulletin*, Mar. 94, No. 03–94, pp. 23–25.

* cited by examiner

*Primary Examiner*—Jean R. Homere
(74) *Attorney, Agent, or Firm*—Shelley M Beckstrand

(57) ABSTRACT

An extensible framework provides a unified interface for data manipulation in a dynamic object-based format. A data access layer of the Transmission Control Protocol/Internet Protocol (TCP/IP) Graphical User Interface (GUI) component uses ODBC to read and write files. Four abstractions implement the framework. These are (1) a CDatabaseManager class that provides access to data stored in a database; (2) a CSpecializedFile class which composes a CDatabaseManager that abstracts the management of reading and writing to database files and provides a unified interface for use by accessors. If the base class functionality of the CSpecializedFile class is not sufficient then derived specialized file classes are implemented to override the CSpecializedFile commit method and update the file in a different-fashion and/or implement specialized get/set methods by column data item and data type; (3) a CRecordArray class which manages vectored access to information stored as objects in a CColumnData class; and (4) a CColumnData object which manages changes made to the information and saves it when requested.

22 Claims, 3 Drawing Sheets

SYSTEM AND METHOD FOR DATA MANIPULATION IN A DYNAMIC OBJECT-BASED FORMAT

BACKGROUND OF THE INVENTION

1. Technical Field of the Invention

This invention pertains to information manipulation. More particularly, it pertains to a dynamic methodology and abstractions for object-based information manipulation.

2. Background Art

Currently, abstracting data into an object for object-based manipulation requires static transformation of the information, and each type of information requires its own unique set of interfaces for manipulating the data. For example, current C++ compilers do not provide a way to handle data stored in a relational manner that has a dynamic number of columns or data types from a C++ client computer. Rather, such compilers require that a description be built at design time that exactly matches the relational data, such as SQL data, being accessed. This requires a per column and data type description for each relational table being accessed. This description is then used by an object oriented program (such as on a C++ computer) to read and write data to the relational data store.

There are two primary problems with this approach. First, for each relational data store accessed a fixed description must be built beforehand. Second, if the data store changes (a column is added or removed, or the data type changed for a column) this fixed description must be changed and the program accessing the relational store recompiled and redistributed to all the clients using the program.

It is an object of the invention to provide an improved client/server system and method providing accesses from a client to data that resides on the same or different machines.

It is a further object of the invention to provide an improved system and method providing dynamic access to data in a uniform and extensible fashion from object-oriented programs.

It is a further object of the invention to provide a system and method for representing and transforming information into a model that provides direct object based manipulation of the data.

It is a further object of the invention to provide a system and method providing for dynamic abstracting of any data into a transformed object.

It is a further object of the invention to provide a uniform, object-based system and method for manipulating the information.

It is a further object of the invention to provide an improved system and method for providing an object-oriented representation of non-object-oriented data using an object-oriented language.

It is a further object of the invention to provide a system and method for accessing a relational data store from an object based program dynamically, that is without requiring data descriptions which are built during design and which, if the data store structure changes, are required to be rebuilt and the program recompiled.

It is a further object of the invention to provide a common row/column access mechanism to relational data from an object-based program.

SUMMARY OF THE INVENTION

In accordance with the invention, an extensible framework structures a unified interface for data manipulation in a dynamic object-based format. A database manager class provides access to data stored in a database. A specialized file class composes the database manager class and provides a unified interface for use by accessors, such as applications 94. A column data class manages changes made to information stored as objects. A record array class manages vectored access to the objects in the column data class.

Other features and advantages of this invention will become apparent from the following detailed description of the presently preferred embodiment of the invention, taken in conjunction with the accompanying drawings.

BEST MODE FOR CARRYING OUT THE INVENTION

The preferred embodiment of the invention provides an object oriented representation of non-object-oriented data and provides access through object-oriented methods in a two-dimensional representation of data (row, column). In a preferred embodiment, the data manipulated is stored in the representation it is read from (that is, its file format or database table schema).

The preferred embodiment of the invention further provides a system and method implementing a single, unified interface for data manipulation in a dynamic object-based format that easily lends itself to object-oriented programming. It provides an extensible framework for developers to provide data component plug-ins that do not require the accessor to be aware of underpinning changes.

In accordance with the preferred embodiment of the invention, an abstraction system and method are provided for manipulating and dynamically transforming data. Further in accordance with the preferred embodiment of the invention, a framework system and method are provided for obtaining and processing and writing data of any type and in accordance with different access methods.

Figure 1:
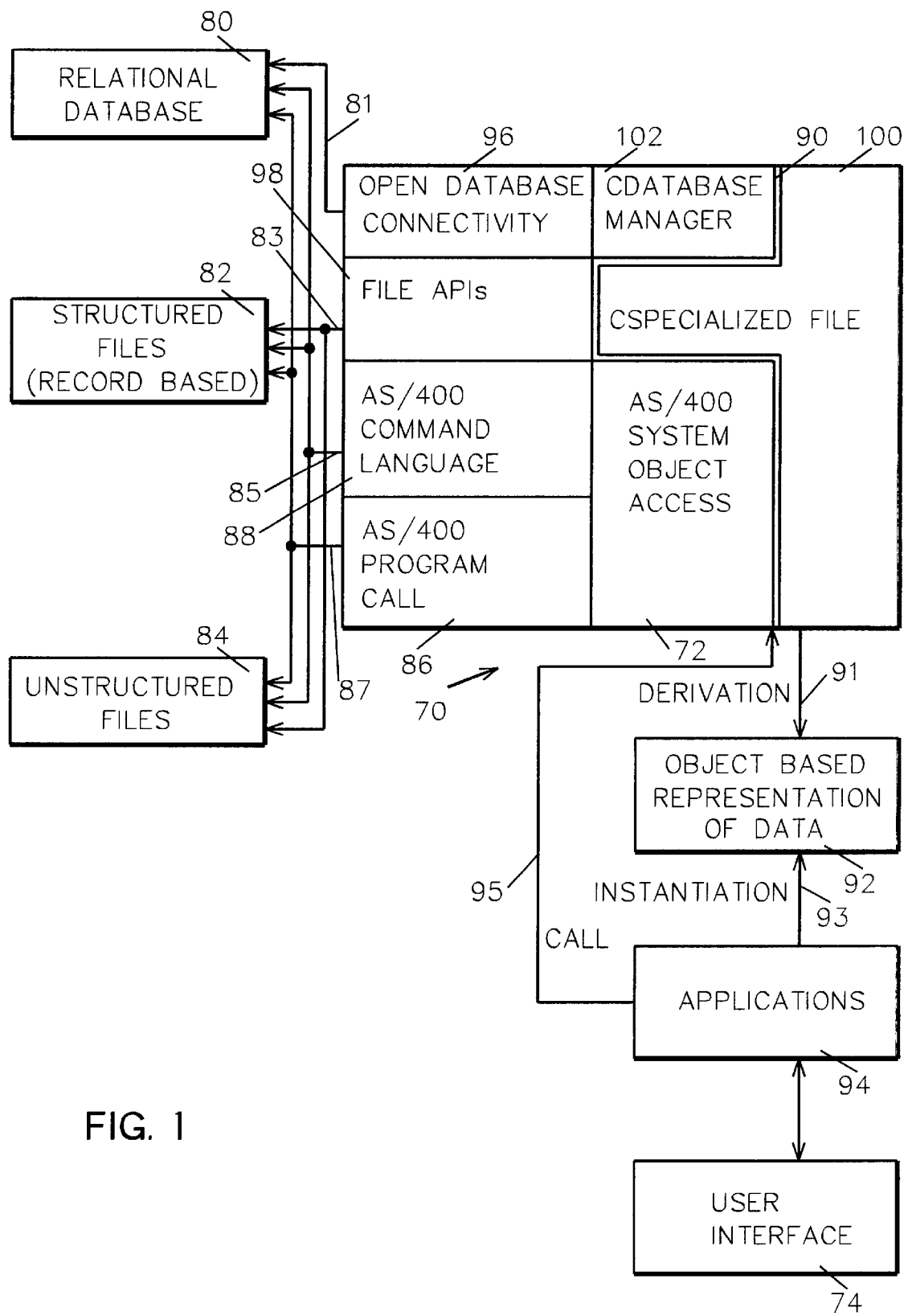
FIG. 1 illustrates the data access layer in accordance with the preferred embodiment of the invention.

Referring to FIG. 1, the structure of the data access layer is set forth in accordance with the preferred embodiment of the invention. Applications 94 are object oriented programs requiring access to data, which may be in any of data files relational database 80, structured files 82 (record based) or unstructured files 84.

In accordance with the invention, a data access layer 70 includes several components, including CSpecializedFile 100 (including interface methods 90), CDataBaseManager 102, ODBC 96, File APIs 98, AS/400 Command Language 88, AS/400 Program Call 86, AS/400 System Object Access 72 and object based representations of data 92. As is represented by line 91, representations 92 are derived from CSpecializedFile 100 and, as represented by line 93, instantiated by application 94 to access relational database 80, structured files 82 and unstructured files 84 by using, as is represented by line 95, interface methods 90. System object access (SOA) 72 provides object based access to the AS/400 command language 88 and AS/400 program calls 86.

Data files 80, 82 and 84 may reside on a different machine from the data access layer 70.

Open database connectivity (ODBC) 96 is an industry standard method for accessing, as is represented by line 81, different vendor databases 80. File application program interfaces (APIs) 98, as is represented by line 83, are provided for reading or writing structured or unstructured files, a specific version being provided by each platform. AS/400 command language 88, as is represented by line 85 is provided for writing to any of data files 80, 82, 84. AS/400 program call 86, as is represented by line 87, is used for reading and writing to any of data files 80, 82, 84.

In accordance with the preferred embodiment of the invention, a multi-dimensional model represents an abstraction provided and maintained across any type of information. The abstraction includes the following:

- A multi-dimensional data abstraction providing vector based access, including Read, Update, Write and Delete.
- Caching of multi-dimensional data for quick access, where the accessor is not aware of whether data is cached or not.
- Commit (that is, save) data upon request.
- Refresh data upon request.
- Automatic data conversion based on format requested by the accessor.
- Reference counting for managing multiple accessors.
- Registration and notification mechanism for accessors to be notified of changes to the data model.

The system and method of the preferred embodiment of the invention provides, first, for an accessor to use and manipulate information and, second, for a component implementor to plug into the framework providing information access.

The accessor uses the preferred embodiment of the invention by instantiating an abstracted model object of the data and registering with the object. This increments the number of users of the data object and allows the data object to notify the accessor when the object changes. Data is read and changed in the data object through the use of set and get methods and by passing a vector that uniquely identifies an element request. Modifications are cached, and are not written until the accessor requests the changes be committed by being written to persistent storage.

Figure 3:
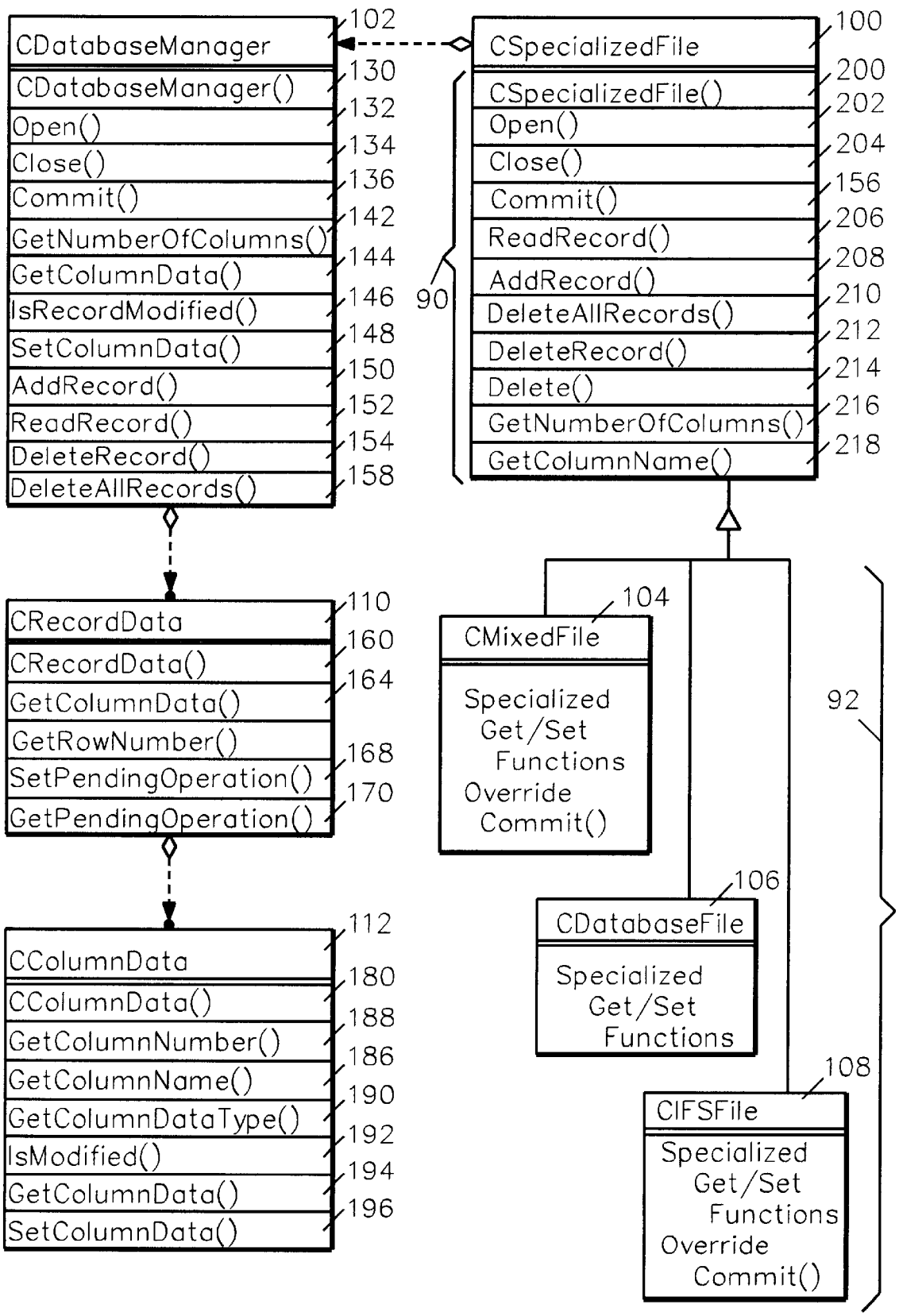
FIG. 3 illustrates the data access layer class of the preferred embodiment of the invention.

Referring to FIG. 3, the component implementer uses four abstractions to implement a framework. The four abstractions are:

- CDatabaseManager 102
- CSpecializedFile 100
- CRecordData 110 (aka CRecordArray)
- CColumnData 112

CDatabaseManager class 102 is an abstraction that provides access to data stored in a database. CSpecializedFile 100 is an abstract class that uses CDatabaseManager 102 for its data access method and provides a unified interface for accessors to use when manipulating information. CRecordArray 110 manages the vectored access to information stored as CColumnData 112 objects. CColumnData objects manage the changes made to the information and save it when requested.

1. Data Access Layer Capabilities

In accordance with a preferred embodiment of the invention, a data access layer for the Transmission Control Protocol/Internet Protocol (TCP/IP) Graphical User Interface (GUI) component uses ODBC to read and write files. In the cases where the files are read-only, CL commands and system APIs (via SOA) are used to write the files. The data access layer provides:

- Read/Write/Delete a record
- Read/Update columns
- Rewrite an entire file
- Column level data conversion
- Commit upon request
- Refresh
- Caching (record-level)

2. Classes Overview

The classes that provide the functionality for the data access layer are:

- Database manager (ODBC manager)
- Record data abstraction
- Column data abstraction
- Specialized file objects Referring to FIG. 3, the data access layer class is diagramed, illustrating selected (but not all) included methods. CSpecializedFile class 100 composes and contains a CDatabaseManager 102 that abstracts the management of reading and writing to data files 80, 82, 84. If the base class functionality of CSpecializedFile 100 is not sufficient then derived specialized file classes are implemented. These specialized classes are CMixedFile 104, CDatabaseFile 106, CIFSFile 108. A specialized file class is derived to override the commit method to handle updating the file in a different fashion and/or implement specialized get/set methods by column data item and data type. For example, a commit method may be written to update the file via CL commands but read the file via the composed CDatabaseManager object 102. Also, the specialized get/set methods may be written to return data for a specific column and in the proper data type for that column.

The class definitions for each class are described below. The classes are:

- CDatabaseManager 102
- CRecordData 110
- CColumnData 112
- CSpecializedFile 100

3. Database Manager (CDatabaseManager)

Database manager class 102 contains the ODBC implementation for connecting, accessing, and managing data in database files. In addition, the database manager class 102 handles automatically creating an ODBC data source if one does not exist for the requested connected system.

Figure 2:
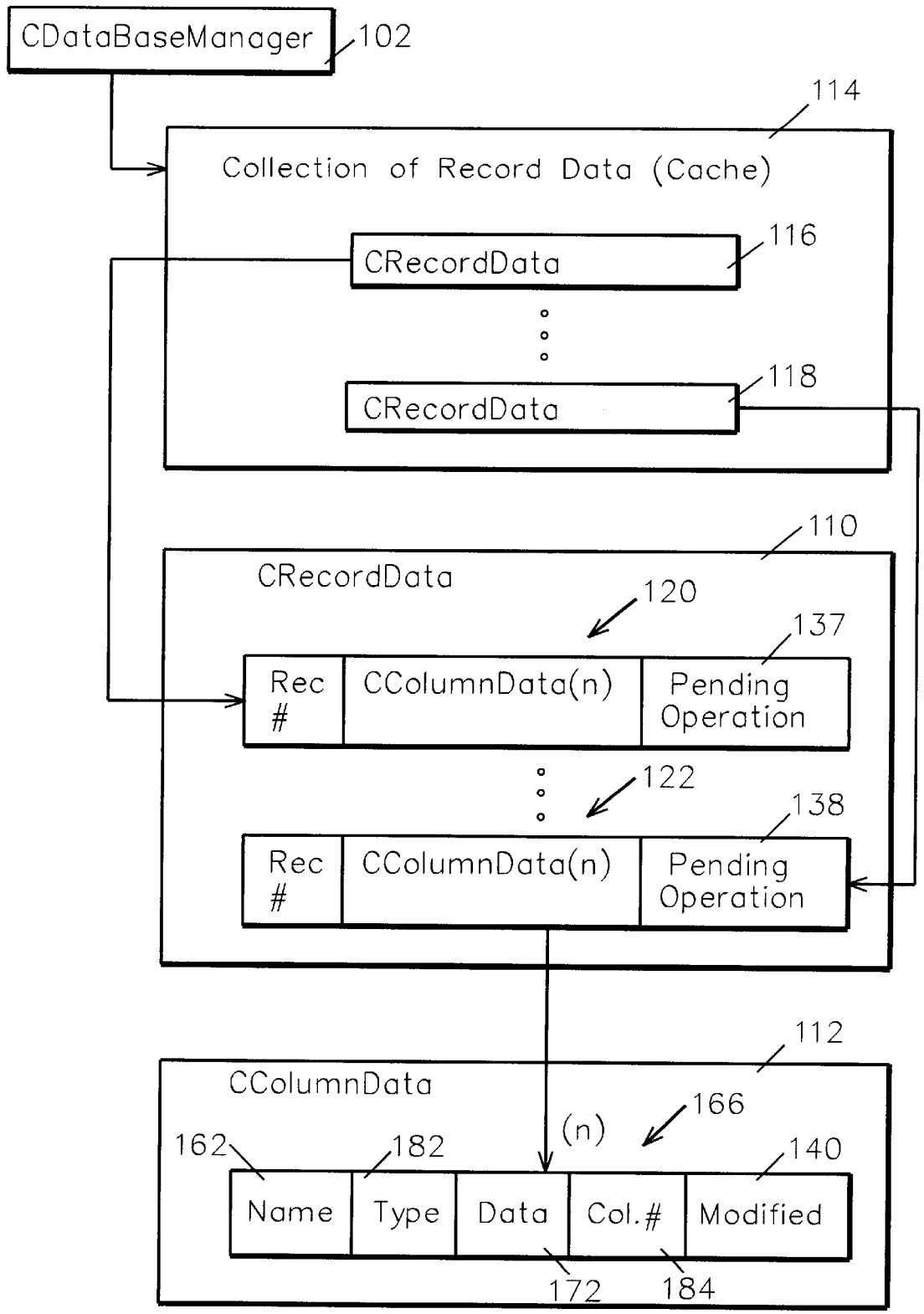
FIG. 2 illustrates the collection of record data of the CDatabaseManager of FIG. 1.

Referring to FIG. 2, the internal data layout of database manager 102, CRecord Data object 110, and CColumnData object 112 is shown. CDatabaseManger 102, which includes a cache 114 of CRecordData pointers 116, 118, manages a collection 120, 122 of CRecordData objects 110 which in turn manage a set of CColumnData objects 112.

The methods for the CDatabaseManager class 102 are:
CDatabaseManager(CString& System name, ErrorInfo&)
  CDatabaseManager( ) constructor 130 handles connecting to the AS/400 via an ODBC data source. If an ODBC data source does not exist, then one will be created and then the connection will be established.
void newFileNew(CString& Library, CString& File, CString& Member, ErrorInfo&)
  The New method (not shown) is used to create a new (empty) database file and a member inside of it.
void oOpenFile(CString& Libary, CString& File, CString& Member, ErrorInfo&)

Open( ) method 132 allocates a SQL statement, executes the SQL select statement to retrieve the information, allocate a record data object, and bind the first record's column and data to the record and column data.
void closeFileClose ( )

Close( ) method 134 closes the file and ends the ODBC data source connection.
void cCommitFile(ErrorInfo&)

Commit( ) method 136 reads through the collection of record data objects 120, 122 and makes the appropriate changes based on the pending operation 137, 138 in the record data object or the IsModified flag 140 of the column data 112. Commit( ) method 136 builds the appropriate SQL commands and executes them. If an error occurs, then a rollback is performed. After the updates are successfully performed, the cache 114 of record data objects 116, 118 is flushed.
int gGetTotalNumberOfColumns( )

GetNumberOfColumns( ) 142 returns the total number of columns in the database file (not shown).
CString* gGetColumnName(int Column number, ErrorInfo& )

GetColumnName( ) (not shown) returns the name of a specific column as a CString object.
int gGetTotalNumberOfRecords( )

GetTotalNumberOfRecords( ) (not shown) returns the total number of records in the database file.
CColumnData* gGetColumnData(int Record number, int Column number, ErrorInfo& ) and
CColumnData* gGetColumnData(int Record number, CStringint & Column name, ErrorInfo& )

GetColumnData( ) method 144 retrieves the data object of a specific record column. This is done by checking the keyed record cache 114 and if the record has already been retrieved then its column data object is returned. If it has not been retrieved yet, then it will be retrieved. This results in the allocation of this record data object, and the binding of the first record's column and data to the record and column data of this record.
Boolean iIsRecordModified( )

IsRecordModified( ) method 146 checks all the modified flags of a column data object and returns TRUE if one or more have been changed and FALSE if none of them have been changed.
void sSetColumnData(int Record number, int Column number, CString& data, ErrorInfo&) and
void sSetColumnData(int Record number, int CString& Column name, CString& data, ErrorInfo)

SetColumnData( ) method 148 updates (in cache 114) a specific column's data member in its column data object 112.
void dDeleteFile(CString& Libary, CString& File, CString& Member, ErrorInfo&)

A DeleteFile( ) method (not shown) deletes a specific file or member in a file.
int aAddRecord(ErrorInfo& )

AddRecord( ) method 150 returns the record number of a new record data object just added to the record data cache 114. An empty record data object 110 (and its associated column data object 112) are created. Subsequent SetColumnData( ) method 148 calls are required to put data into the new record.
CString* rReadRecord(int Record number, ErrorInfo& )

ReadRecord( ) method 152 provides an unformatted way of reading a record at a time. It return the contents of a record as a CString. If the record contains multiple columns, then each column is delimited by a tab character (\t).
void dDeleteRecord(int Record number, ErrorInfo& )

DeleteRecord( ) method 154 deletes a record by marking it in the record data cache 114 as deleted. In order for the delete to take affect a subsequent commit( ) 136 must be called.
void dDeleteAllRecords(ErrorInfo& )

DeleteAllRecords( ) method 158 deletes all records in the file by marking all the cached records 114 as deleted and maintaining a state variable (not shown) that represents that all records have been deleted.

The protected data members for theCDatabaseManager class are:
Collection keyed by record number and column name of record abstraction objects and modification interpretation (record cache)
CString Library
CString File
CString Member name
int Total number of records
CString System name
Data source handle
intCString Total number of columns
Boolean DeleteAll

4. Record Data (CRecordData)

Record data class 110 is contained in the record cache 114 managed by CDatabaseManager class 102. The record data class 110 contains and manages a record that has been retrieved, deleted, or created (new).

The methods for the CRecordData class are:
CRecordData(int Record number, CDatabaseManager & dbMgr)

CRecordData( ) constructor 160 creates a record data object 120, 122 and then use the CDatabaseManager object 102 to retrieve the number of columns in the file. It uses this value to create a collection of column data objects 112 keyed by column name 162.
CColumnData* gGetColumnData(int Column number, ErrorInfo& ) and
CColumnData* gGetColumnData(CString Column name, ErrorInfo& )

GetColumnData( ) method 164 retrieves a specific column's column data object 166.
int gGetRecordNumber( )

A GetRecordNumber( ) method (not shown) returns the record number this record data object represents.
Boolean iIsRecordModified( )

An IsRecordModified( ) method (not shown) searches the list of column data objects 166 the record object 122 is managing and returns TRUE if one or more columns have their modified flag 140 set. Otherwise, FALSE is returned.
int gGetPendingOperation( )

GetPendingOperation( ) method 170 returns the operation pending 137, 138 on this record 110 (new or delete).
void sSetPendingOperation(int PendingOperation)

SetPendingoperation( ) method 168 sets the pending operation member data 172 to the value passed in. Pending operation 168 is used to mark records as either new or deleted. The modified flag 140 of each column data object 166 manages if a column has been updated.

The protected data members for the CRecordData class 110 are:
collection of Column data objects keyed by column name and number
int Record number Pending operation (New, Delete)
reference to CDatabaseManager object

5. Column Data Description (CColumnData)

Column data class 112 is contained in the record data object 110 managed by CDatabaseManager class 102. Column data class 112 contains and manages the column information and data of a record 120, 122 that has been retrieved, deleted, or created.

The methods for the CColumnData class 112 are:
CColumnData(CString& ColumnName, int ColumnNumber, int DataType, CString& Data)

CColumnData( ) constructor 180 builds a column data object 166 representing the column's data 172 and information, including name 162, type 182, column number 184, and modified flag 140.

CString* gGetColumnName( )

GetColumnName method 186 returns the name of a column.

int gGetColumnNumber( )

GetColumnNumber method 188 returns the number of a column.

int gGetColumnDataType( )

GetColumnDataType( ) method 190 returns the data type of a column.

Boolean iIsModified( )

IsModified method 192 is used to determine if the data has been modified.

dataType gGetColumnData( )

GetColumnData( ) method 194 returns the data 172 of a column. Overloaded methods are provided for each return data type.

void sSetColumnData(dataType)

SetColumnData( ) method 196 sets the data 172 of a column. Overloaded methods are provided for each data type. The protected data members for CColumnData 112 are:

CString column name
SQL type column data type
CString column data type
Boolean Modified flag
int column number

6. Specialized File Object (CSpecializedFile)

Specialized file object class 100 is a parent class to derived file objects 104, 106 and 108. It provides base class functionality for construction CSpecializedFile( ) 200, Open( ) 202, Close( ) 204, Commit( ) 156, ReadRecord( ) 206, AddRecord( ) 208, DeleteAllRecords( ) 210, DeleteRecord( ) 212, Delete( ) 214, GetNumberOfColumns( ) 216, and GetColumnName( ) 218. The methods for theCSpecializedFile class are:
CSpecializedFile(CString& SystemName, CString& Library, CString& FileName, CString & MemberName, ErrorInfo& ) and
CSpecializedFile(CString& SystemName, CString& FilePath (IFS style), ErrorInfo& )

CSpecializedFile( ) constructor 200 builds a file object 106 representing the file to be manipulated and constructs the CDatabaseManager object102. If CL commands will be used, then the CL command stack object (not shown) is constructed. In addition, if SOA object wrappers (not shown) for System APIs are needed, then these are constructed.

void newFileNew((CString& Library, CString& FileName, CString& MemberName, ErrorInfo&)

A New method (not shown) is used to create a new (empty) database file 106 and a member inside of it.

void openFileOpen(ErrorInfo&)

Open( ) method 202 calls the Open( ) method 132 of the CDatabaseManager object 102 to open the requested file.

void closeFileClose(ErrorInfo&)

Close( ) method 204 calls the Close( ) method 134 of the CDatabaseManager object 102 to close the requested file. If changes are to be saved, Commit( ) method 156 must be called. Otherwise, the changes will be lost.

int gGetTotalNumberOfColumns( )

GetTotalNumberOfColumns( ) method 216 (aka GetNumberOfColumns( ) ) returns the total number of columns in the requested file.

CString* gGetColumnName(int Column number, ErrorInfo&)

GetColumnName( ) method 218 returns the name of the column as a string.

void cCommitFile(ErrorInfo&)

Commit( ) method 156 calls the Commit( ) method 136 of CDatabaseManager object 102 if the requested file can be written out using ODBC (file has read/write capabilities). Otherwise, Commit( ) method 156 builds the appropriate CL command string (or set of CL commands) and SOA object updates, if necessary. Then, it performs the CL commands and SOA object commit(s). The CL command(s) execution is performed using the CL command stack object.

CString* rReadRecord(int Record number, ErrorInfo&)

ReadRecord( ) method 206 calls the ReadRecord( ) method 152 of the CDatabaseManager object 102 to read a specific record in the requested file and return it in a formatted Cstring.

void sSetColumnData(int Record number, int Column number, CString& data, ErrorInfo&)

A SetColumnData( ) method (not shown) calls the SetColumnData( ) method 148 of the CDatabaseManager object 102 to set the data of a specific column.

int aAddRecord(ErrorInfo&)

AddRecord( ) method 208 calls the AddRecord( ) method 150 of the CDatabaseManager object 102 to add an empty record that can be set later using specialized sets. AddRecord( ) 208 returns the record number of the record added.

void dDeleteRecord(int Record number, ErrorInfo&)

DeleteRecord( ) method 212 calls the DeleteRecord( ) method 154 of CDatabaseManager object 102 to mark the specific record as deleted. The record will be deleted when Commit( ) method 156 is called.

void dDeleteAllRecords(ErrorInfo&)

DeleteAllRecords( ) method 210 calls the DeleteAllRecords( ) method 158 of the CDatabaseManager object 102 to mark all the records in the file as deleted. All the records will be deleted when the Commit( ) method 156 is called.

Additional methods may be implemented by derived specialized file objects 104, 106, 108. In particular, get and set methods are written to return column data in a specific data type and to set column information in a specific data type.

The protected data members for CSpecializedFile are:
CDatabaseManager object pointer
CL command stack object pointer
SOA object pointer(s)
CString library
CString File
CString Member name CString Path CString System Name In operation, an example of the use of the structures and methods heretofore described, is having several applications 94 managing a machine's TCP/IP configuration. This operation requires access to relational database 80 and structured files 82 by applications 94. A first application 94 instantiates object based representation of data CDataBase file 106 to read and write the TCP/IP addressing information. A second application 94 sets up the machines domain name system (DNS) information by instantiating CIFSFile 108 to read and write the DNS entries in structured file 82. A third application 94 manages the machines TCP/IP routing information (RIP) files by instantiating CMixedFile 104. All of this information is presented to the user via a user interface 74 and then stored when the user has completed the configuration. Alternatively, object based representations of data 92 may be created by an application programmer and used by applications 94 directly (without requiring a user interface 74).

Advantages over the Prior Art

It is an advantage of the invention that there is provided an improved client/server system and method providing accesses from a client to data that resides on the same or different machines.

It is a further advantage of the invention that there is provided an improved system and method providing dynamic access to data in a uniform and extensible fashion from object-oriented programs.

It is a further advantage of the invention that there is provided a system and method for representing and transforming information into a model that provides direct object based manipulation of the data.

It is a further advantage of the invention that there is provided a system and method providing for dynamic abstracting of any data into a transformed object.

It is a further advantage of the invention that there is provided a uniform, object-based system and method for manipulating the information It is a further advantage of the invention that there is provided a system and method for accessing a relational data store from an object based program dynamically, that is without requiring data descriptions which are built during design and which, if the data store structure changes, are required to be rebuilt and the program recompiled.

It is a further advantage of the invention that there is provided a common row/column access mechanism to relational data from an object-based program.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Further, each step of the method may be executed on any of several general computer systems, such as an IBM System 390, AS/400, PC or the like and pursuant to one or more, or a part of one or more, program modules or objects generated from any of several programming language, such as C++, Java, or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for manipulating data, comprising the steps of:

structuring in an extensible framework a unified interface for data manipulation in a dynamic object-based format, said framework including an interface, a database manager class for providing access to data stored in a database and a specialized file class that defines an object based method of managing said data;

operating said specialized file class to compose said database manager class and provide a unified interface for use by accessors to relational data; and operating said specialized file class to manage vectored access to information stored as objects.

2. A method of claim 1, comprising the further steps of:

operating said specialized file class to implement derived specialized file classes selectively for overriding a commit method and executing specialized get and set methods by column data item and data type.

3. The method of claim 1, comprising the further steps of:

operating said specialized file class to provide a unified interface for use by accessors selectively to manage structured and unstructured data.

4. An extensible framework system structuring a unified interface for data manipulation in a dynamic object-based format, said framework comprising:

a database manager class for providing access to data stored in a database;

a specialized file class for composing said database manager class and providing a unified interface for use by accessors;

a column data class for managing changes made to information stored as objects; and a record array class for managing vectored access to said objects in said column data class.

5. The extensible framework system of claim 4, further comprising:

at least one derived specialized file class for providing unified access to non-relational data and selectively overriding a commit method and executing specialized get and set methods by column data item and data type.

6. The extensible framework system of claim 4, said database manager class further comprising:

a database manager constructor for establishing a connection to a data source;

a new method for creating a database file and a member within it;

an open method for allocating and binding a record data object;

a close method for closing said database file and ending said connection to said data source;

a commit method for selectively updating or rolling back changes to said record data object;

a get total number of columns method for returning the total number of columns in said database file;

a get column name method for returning the name of a specific column;

a get total number of records method for returning the total number of records in said database file;

a get column data method for retrieving the data object of a specific record column;

an is record modified method for checking modified flags of column data objects for those which have been changed;

a set column data method for updating a data member in said column data object;

a delete file method selectively for deleting said database file or a member in said database file;

an add record method for creating an empty record data object and its associated column data object;

a read record method for reading a record;

a delete record method for marking a record as deleted; and a delete all records method for marking all records in said databasefile as deleted.

7. The extensible framework system of claim 6, said database manager having as protected data members a record cache, a string library, a string file, a string member name, string system name, total number of records, total number of columns, data source handle, and delete all.

8. The extensible framework system of claim 4, said record data class further comprising:

a record data constructor for creating a record data object and creating a collection of column data objects keyed by column name;

a get column data method for retrieving a specific column data object;

a get record number method for obtaining a record number representing a record data object;

an is record modified method for determining if one or more columns of a record object have been modified;

a get pending operation method for determining a pending operation on a record object; and a set pending operation method for marking records as new or deleted.

9. The extensible framework system of claim 8, said record data class having as protected data members a collection of column data objects keyed by column name and number, record number, pending operation, and a reference to said database manager object.

10. The extensible framework system of claim 4, said column data class further comprising:

a column data constructor for building a column data object;

a get column name method for obtaining the name of a column;

a get column number method for obtaining the number of a column;

a get column data type method for obtaining the data type of a column;

an is modified method for determining if data has been modified;

a get column data method for returning the data of a column; and a set column data method for setting the data of a column.

11. The extensible framework system of claim 10, said column data class having as protected data members column name, column data type, modified flag and column number.

12. The extensible framework system of claim 10, said specialized file class having as protected data members a database manager object pointer, a command stack object pointer, one or more object pointers, a library, a file, a member name, a path and a system name.

13. The extensible framework system of claim 4, said specialized file class providing base class functionality for and further comprising:

a specialized file constructor for building a file object representing a file to be manipulated and for constructing said database manager object;

a new method for creating a member within an empty data file;

a first open method for calling a second open method of said data manager to open a file;

a first close method for calling a second close method of said data manager to close a file;

a get total number of columns method for determining the number of columns in a file;

a get column name method for obtaining the name of a column;

a first commit method for calling a second commit method of said data manager committing changes to a file;

a first read record method for calling a second read record method of said data manager to read a specific record;

a first set column data method for calling a second set column data method to set the data of a specific column;

a first add record method for calling a second add record method of said data manager for adding an empty record for later setting by way of specialized set methods;

a first delete record method for calling a second delete record method of said data manager to mark a specific record as deleted; and a first delete all records method for calling a second delete all records method of said data manager to mark all records in a file as deleted.

14. A program storage device readable by a machine, tangibly embodying a program of instructions executable by a machine to perform method steps for manipulating data, said method steps comprising:

structuring in an extensible framework a unified interface for data manipulation in a dynamic object-based format, said framework including an interface, a database manager class for providing access to data stored in a database and a specialized file class that defines an object based method of managing said data;

operating said specialized file class to compose said database manager class and provide a unified interface for use by accessors to relational data; and operating said specialized file class to manage vectored access to information stored as objects.

15. An article of manufacture comprising:

a computer useable medium having computer readable program code means embodied therein for manipulating data, the computer readable program means in said article of manufacture comprising:

computer readable program code means for causing a computer to effect structuring in an extensible framework a unified interface for data manipulation in a dynamic object-based format, said framework including an interface, a database manager class for providing access to data stored in a database and a specialized file class that defines an object based method of managing said data;

computer readable program code means for causing a computer to effect operating said specialized file class to compose said database manager class and provide a unified interface for use by accessors to relational data; and computer readable program code means for causing a computer to effect operating said specialized file class to manage vectored access to information stored as objects.

16. An extensible framework system structuring a unified interface for data manipulation in a dynamic object-based format, said framework comprising:

a database manager class for providing access to data stored in a database;

a specialized file class for composing said database manager class and providing a unified interface for use by accessors;

a column data class for managing changes made to information stored as objects;

a record array class for managing vectored access to said objects in said column data class;

said database manager class further comprising:
a database manager constructor for establishing a connection to a data source;
a new method for creating a database file and a member within it;
an open method for allocating and binding a record data object;
a close method for closing said database file and ending said connection to said data source;
a commit method for selectively updating or rolling back changes to said record data object;
a get total number of columns method for returning the total number of columns in said database file;
a get column name method for returning the name of a specific column;
a get total number of records method for returning the total number of records in said database file;
a get column data method for retrieving the data object of a specific record column;
an is record modified method for checking modified flags of column data objects for those which have been changed;
a set column data method for updating a data member in said column data object;
a delete file method selectively for deleting said database file or a member in said database file;
an add record method for creating an empty record data object and its associated column data object;
a read record method for reading a record;
a delete record method for marking a record as deleted; and
a delete all records method for marking all records in said databasefile as deleted.

17. The extensible framework system of claim 16, said database manager having as protected data members a record cache, a string library, a string file, a string member name, string system name, total number of records, total number of columns, data source handle, and delete all.

18. An extensible framework system structuring a unified interface for data manipulation in a dynamic object-based format, said framework comprising:

a database manager class for providing access to data stored in a database;

a specialized file class for composing said database manager class and providing a unified interface for use by accessors;

a column data class for managing changes made to information stored as objects; and a record array class for managing vectored access to said objects in said column data class.

said record data class further comprising:
a record data constructor for creating a record data object and creating a collection of column data objects keyed by column name;
a get column data method for retrieving a specific column data object;
a get record number method for obtaining a record number representing a record data object;
an is record modified method for determining if one or more columns of a record object have been modified;
a get pending operation method for determining a pending operation on a record object; and
a set pending operation method for marking records as new or deleted.

19. The extensible framework system of claim 18, said record data class having as protected data members a collection of column data objects keyed by column name and number, record number, pending operation, and a reference to said database manager object.

20. An extensible framework system structuring a unified interface for data manipulation in a dynamic object-based format, said framework comprising:

a database manager class for providing access to data stored in a database;

a specialized file class for composing said database manager class and providing a unified interface for use by accessors;

a column data class for managing changes made to information stored as objects; and a record array class for managing vectored access to said objects in said column data class.

said column data class further comprising:
a column data constructor for building a column data object;
a get column name method for obtaining the name of a column;
a get column number method for obtaining the number of a column;
a get column data type method for obtaining the data type of a column;
an is modified method for determining if data has been modified;
a get column data method for returning the data of a column; and
a set column data method for setting the data of a column.

21. The extensible framework system of claim 19, said column data class having as protected data members column name, column data type, modified flag and column number.

22. The extensible framework system of claim 19, said specialized file class having as protected data members a database manager object pointer, a command stack object pointer, one or more object pointers, a library, a file, a member name, a path and a system name.

* * * * *